UNITED STATES PATENT OFFICE.

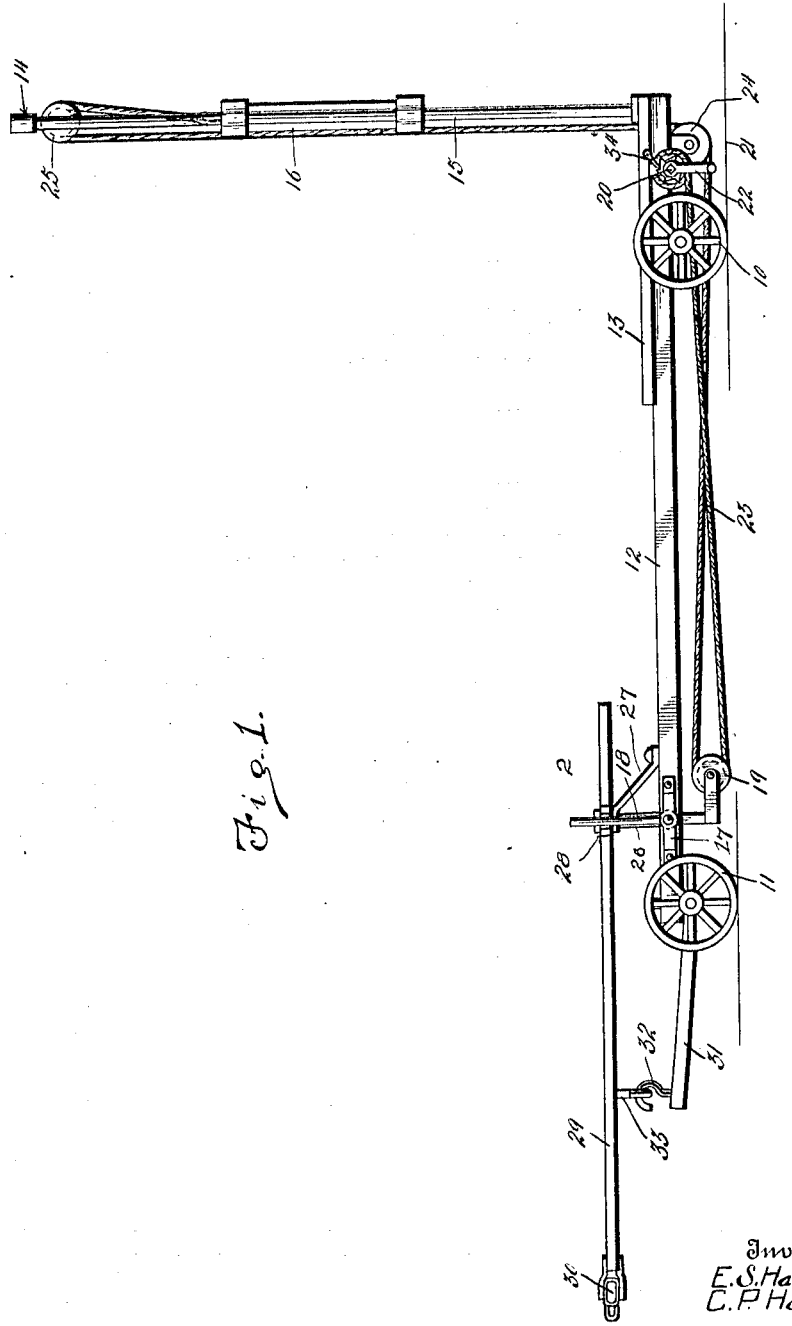

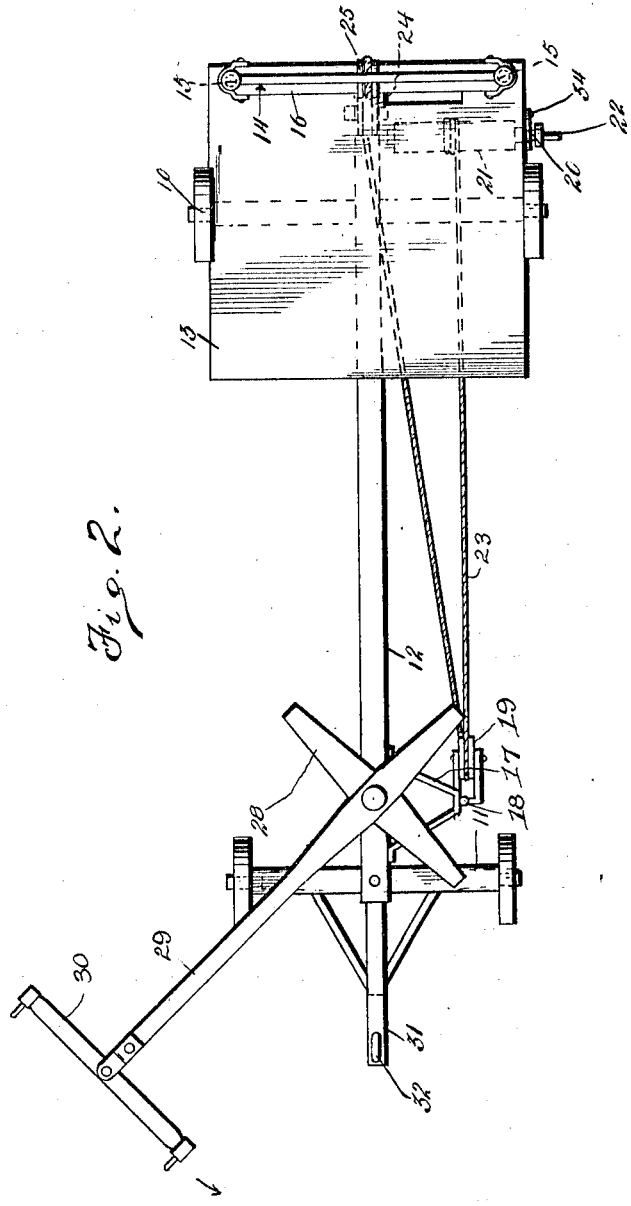

EMIL S. HANSEN AND CHRISTIAN P. HANSEN, OF BELLA VISTA, CALIFORNIA.

POST-DRIVER.

1,041,073.　　　　Specification of Letters Patent.　　Patented Oct. 15, 1912.

Application filed January 5, 1912. Serial No. 669,628.

*To all whom it may concern:*

Be it known that we, EMIL S. HANSEN and CHRISTIAN P. HANSEN, citizens of the United States, residing at Bella Vista, in the county of Shasta, State of California, have invented certain new and useful Improvements in Post-Drivers; and we do hereby declare the following to be a full, clear, and exact description of the invention, such as will enable others skilled in the art to which it appertains to make and use the same.

Our invention relates to new and useful improvements in post drivers and the object of our invention is to improve the construction and increase the efficiency of mechanisms of the above described character.

A further object of our invention is to provide a post driver having a driving weight mounted for vertical movement and adapted to be raised by a sweep actuated by a horse or other suitable draft animal, said sweep being a part of the movable body of the post driver and so arranged that the draft animal attached thereto may either actuate it to raise the weight, or that it may be positioned to serve as a draft tongue for the machine.

With these and other objects in view, our invention will be more fully described, illustrated in the accompanying drawings which show a preferred embodiment of our device and then specifically pointed out in the claims which are attached to and form a part of this application.

In the drawings, Figure 1 is a side elevation of our improved machine. Fig. 2 is a top plan thereof.

Referring more specifically to the drawings, in which similar reference numerals designate corresponding parts throughout, the body of our improved post driver consists primarily of a rear wheel truck 10, and a forward wheel truck 11 joined together in the customary manner by a reach 12, said trucks being so proportioned that the reach is but a slight distance above the ground.

Mounted upon the rear truck is a platform 13 and extending upwardly from the rear end of this platform is a frame 14 provided with guides 15 between which is reciprocally mounted a driving weight or hammer 16, the rear portion of the platform beneath said hammer being recessed to permit the positioning of the post which is to be driven. The reach 12 adjacent its forward end has secured thereto the bracket 17 which extends in a horizontal direction and pivotally secured to the bracket is a lever 18 upon the lower end of which is attached a pulley 19. Mounted for rotation in suitable bearings carried by the lower face of the platform 13 is a shaft 20 carrying a winding drum 21, one end of the shaft being extended beyond the platform and provided with a hand crank 22. A cable 23 is secured by one end to this drum and is passed forwardly about the pulley 19, rearwardly beneath a pulley 24 carried by the reach, then upwardly over a pulley 25 carried by the upper end of the frame 14 and the free end of this cable is then passed downwardly and attached to the hammer 16.

Extending vertically upwardly from the forward truck 11 is a shaft 26 which shaft, is secured in position by suitable braces 27 and mounted for rotation upon the upper end of the shaft is a cross shaped member 28, one arm of which is extended to form a sweep beam 29 upon the free end of which is secured a swingletree or other suitable draft attaching device 30. As will be readily seen by referring to Fig. 2 of the drawing the arms of the cross shaped member 28 are so proportioned that as the sweep beam is turned about the shaft 26 as an axis said arms will consecutively engage the upper end of the lever 18 and force the same rearwardly, thus moving the pulley 19 forwardly and raising the hammer 16. It will be understood that the sweep beam is turned to the left as indicated by the arrow in Fig. 2. As soon as the cross arm becomes disengaged from the lever the hammer will fall and in so doing will draw the lever back to original position where it will be immediately engaged by the next succeeding cross arm.

The forward truck 11 is provided with a stub tongue 31 provided at its free end with a hook 32 while the sweep beam 29 is provided intermediate its length with a ring 33 which may be engaged by the hook 32 thus locking the sweep beam and tongue against independent movement, whereby the sweep beam becomes the draft tongue of the machine. By this means the draft animal may be employed either to draw the machine from post to post or to raise the hammer without reharnessing.

In operation the post to be driven is positioned beneath the hammer and the sweep beam is rotated in the proper direction by a suitable draft animal to consecutively bring the cross arms into engagement with the lever and so actuate the handle as previously described. The length of the cable 23 may be readily regulated by releasing the locking pawl 34 and rotating the winding drum 21 in the proper direction, as required. The locking pawl 34, which engages with a ratchet disk carried by the drum, also serves to maintain the latter against counter rotation during operation of the device.

From the foregoing description it will be apparent that we have provided an extremely simple and efficient machine for driving posts or piles and one in which the entire labor necessary may be obtained from a draft animal while still attached to the tongue of the machine.

It will of course be understood that minor changes in the details of construction may be made if desired without in the slightest degree departing from the spirit of our invention.

What we claim is:—

1. In a device of the character described, the combination with a forward and a rear truck and a reach connecting said trucks, of a vertical frame carried by the rear truck, a hammer member mounted for reciprocation in said frame, a lever pivoted intermediate its length to the forward portion of the reach, a pulley carried by the lower end of said lever, a windlass carried by the rear truck, a cable connected by one end to said windlass and having its other end passed forwardly about said pulley, said cable being then passed rearwardly over a pulley carried by the top of the frame and downwardly and secured at its free end to the hammer member and means operable by a draft animal for intermittently engaging the upper end of said lever and swinging the same rearwardly.

2. In a device of the character described, the combination with a forward and a rear truck and reach connecting the two, of a vertical frame carried by the rear truck, a hammer member mounted for reciprocation in said frame, a lever pivoted to the forward portion of said reach, means for intermittently swinging said lever, and means coacting between said lever and hammer whereby the rearward swinging of the lever will raise said hammer.

3. In a device of the character described, the combination with a forward and a rear truck and a reach connecting the two, of a hammer member carried by the rear truck and mounted for vertical reciprocation, a lever pivoted intermediate its length to said reach and with its upper end extending above the same, a vertical shaft carried by the forward truck, a cross shaped member rotatably mounted upon said shaft and having one of its arms extended to form a sweep beam, the arms of said cross shaped member being adapted to consecutively engage the upper end of said lever and swing the same forwardly, and means coacting between the lower end of said lever and the hammer whereby the swinging of said lever will raise the hammer.

In testimony whereof, we affix our signatures, in presence of two witnesses.

EMIL S. HANSEN.
CHRISTIAN P. HANSEN.

Witnesses:
J. O. BLICHFELDT,
C. P. HANSEN.